(12) United States Patent
Wymore et al.

(10) Patent No.: US 6,741,791 B1
(45) Date of Patent: May 25, 2004

(54) USING SPEECH TO SELECT A POSITION IN A PROGRAM

(75) Inventors: Ben S. Wymore, Portland, OR (US); Christopher H. Genly, Forest Grove, OR (US); David G. Hicks, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/494,806

(22) Filed: Jan. 31, 2000

(51) Int. Cl.[7] .................................................. H04N 5/91
(52) U.S. Cl. ............................... 386/46; 386/95; 386/96
(58) Field of Search ............................. 386/46, 95, 96, 386/125, 126, 104, 105; 704/275; 707/102; 348/734; 455/563

(56) References Cited

U.S. PATENT DOCUMENTS 4,305,131 A * 12/1981 Best ........................... 345/716
5,517,257 A * 5/1996 Dunn et al. .................. 348/734
5,566,271 A * 10/1996 Tomitsuka et al. ........... 704/275
6,408,301 B1 * 6/2002 Patton et al. ................ 707/102
6,418,199 B1 * 7/2002 Perrone ....................... 704/725

FOREIGN PATENT DOCUMENTS

JP           40417507 A  *  6/1993

* cited by examiner

Primary Examiner—Huy Nguyen
(74) Attorney, Agent, or Firm—Trop, Pruner & Hu, P.C.

(57) ABSTRACT

A system allows a user to use spoken commands to select a position in an audio/visual program. The program may be identified by a file associated with a stored portion of a program that includes a field that identifies positions in the program. When the user requests a position, the user's speech is recognized to produce information that may be compared to the information in the field to locate the position selected by the user.

26 Claims, 12 Drawing Sheets

USING SPEECH TO SELECT A POSITION IN A PROGRAM

BACKGROUND

This invention relates generally to the operation and play of audio/visual program.

"Audio/visual programs" may be video or audio or audio and video recordings such as those recorded on compact disks and digital video disks, as well as information stored on digital memories associated with processor-based systems such as hard disk drives. In a number of cases, it is desirable to locate and select a given portion within an overall audio/visual program. For example, a user may wish to watch or listen to a given track or chapter within a recording.

In many audio/visual systems, the user may be limited to a remote control unit to provide inputs for controlling the playback of audio/visual programs. These remote control units may control a television receiver and a processor-based system such as a set-top box or may control various audio/visual playback appliances such as a video cassette recorder, a digital video disk player, or other similar appliances. The set-top box generally sits atop a television receiver and provides advanced features such as electronic programming guides for the television receiver.

Thus, the user may wish to enter relatively complex requests to the television receiver or associated processor-based system through the remote control unit. However, the remote control unit, which is a handheld device, generally can only accommodate a very limited keyboard. As a result, the amount of information which the user can readily provide through the remote control unit is very limited.

Thus, there is a need for a better way to enable users to select audio/visual program portions.

DETAILED DESCRIPTION

As used herein, the term "conversational" as applied to a speech responsive system involves the ability of the system to respond to broadly or variously phrased requests, to use conversational history to develop the meaning of pronouns, to track topics as topics change and to use reciprocity. Reciprocity is the use of some terms that were used in the questions as part of the answer.

Figure 1:
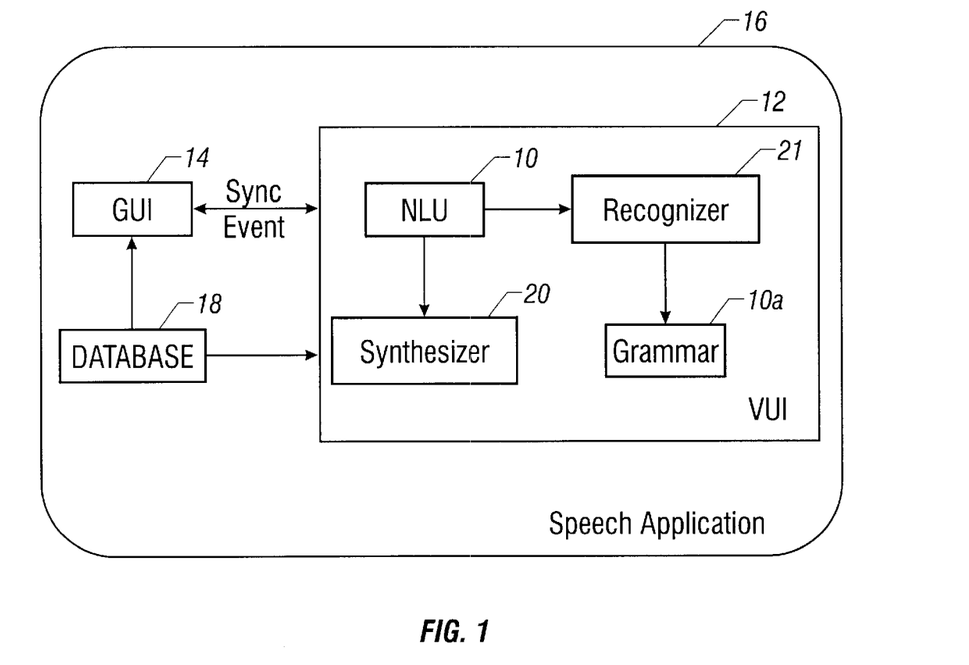
FIG. 1 is a schematic depiction of software modules utilized in accordance with one embodiment of the present invention.

Referring to FIG. 1, conversational system software may include an application 16 that may be an electronic programming guide application in one embodiment of the present invention. In the illustrated embodiment, the application includes a voice user interface 12 and the graphical user interface 14. The application 16 may also include a database 18 which provides information such as the times, programs, genre, and subject matter of various programs stored in the database 18. The database 18 may receive inquiries from the voice user interface 12 and the graphical user interface 14. The graphical and voice user interface may be synchronized by synchronization events.

The voice user interface 12 may also communicate with a speech synthesizer 20 and a speech recognizer 21. In other embodiments of the present invention, output responses from the system may be provided on a display as text from a synthesizer 20 other than as voice output responses. The module 10 may include a grammar 10a which may utilized by the recognizer 21.

A state vector is a representation of the meaning of an utterance by a user. A state vector may be composed of a set of state variables. Each state variable has a name, a value and two flags. An in-context state vector may be developed by merging an utterance vector which relates to what the user said and a history vector. A history vector contains information about what the user said in the past together with information added by the system in the process of servicing a query. Thus, the in-context state vector may account for ambiguity arising, for example, from the use of pronouns. The ambiguity in the utterance vector may be resolved by resorting to a review of the history vector and particularly the information about what the user said in the past.

In any state vector, including utterance, history or in-context state vectors, the state variables may be classified as SELECT or WHERE variables (borrowing the terms SELECT and WHERE from the SQL database language). SELECT variables represent information a user is requesting. In other words, the SELECT variable defines what the user wants the system to tell the user. This could be a show time, length or show description, as examples.

WHERE variables represent information that the user has supplied. A WHERE variable may define what the user has said. The WHERE variable provides restrictions on the scope of what the user has asked for. Examples of WHERE variables include show time, channel, title, rating and genre.

The query "When is X-Files on this afternoon?" may be broken down as follows:

Request: When (from "When is X-Files on this afternoon?")
Title: X-Files
Part_of_day_range: afternoon The request (when) is the SELECT variable. The WHERE variables include the other attributes including the title (X-Files) and the time of day (afternoon).

The information to formulate responses to user inquiries may be stored in a relationship database in one embodiment of the present invention. A variety of software languages may be used. By breaking a query down into SELECT variables and WHERE variables, the system is amenable to programming in well known database software such as Structured Query Language (SQL). SQL is standard language for relational database management systems. In SQL, the SELECT variable selects information from a table. Thus, the SELECT command provides the list of column names from a table in a relational database. The use of a WHERE command further limits the selected information to particular rows of the table. Thus, a bare SELECT command may provide all the rows in a table and the combination of a SELECT and a WHERE variables may provide less than all the rows of a table, including only those items that are responsive to both the select and the where command. Thus, by resolving spoken queries into SELECT and WHERE aspects, the programming may be facilitated in some embodiments of the present invention.

Figure 2:
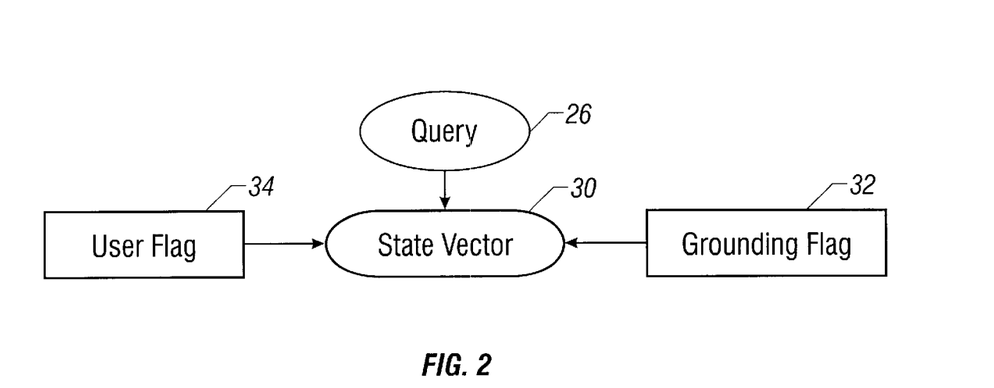
FIG. 2 is a schematic representation of the generation of a state vector from components of a spoken query and from speech generated by the system itself in accordance with one embodiment of the present invention.

Referring to FIG. 2, a user request or query 26 may result in a state vector 30 with a user flag 34 and a grounding flag 32. The user flag 34 indicates whether the state variable originated from the user's utterance. The grounded flag 32 indicates if the state variable has been grounded. A state variable is grounded when it has been spoken by the synthesizer to the user to assure mutual understanding. The VUI 12 may repeat portions of the user's query back to the user in its answer.

Grounding is important because it gives feedback to the user about whether the system's speech recognition was correct. For example, consider the following spoken interchange:

1. User: "Tell me about X-Files on Channel 58".
2. System: "The X-Files is not on Channel 50".
3. User: "Channel 58".
4. System: "On Channel 58, an alien . . . "

At utterance number 1, all state variables are flagged as from the user and not yet grounded. Notice that the speech recognizer confused fifty and fifty-eight. At utterance number 2, the system has attempted to repeat the title and the channel spoken by the user and they are marked as grounded. The act of speaking parts of the request back to user lets the user know whether the speech recognizer has made a mistake. Grounding enables correction of recognition errors without requiring re-speaking parts of the request back to user. At utterance number 3, the user repeats "58" and the channel is again ungrounded. At utterance number 4, the system speaks the correct channel and therefore grounds it.

Figure 3:
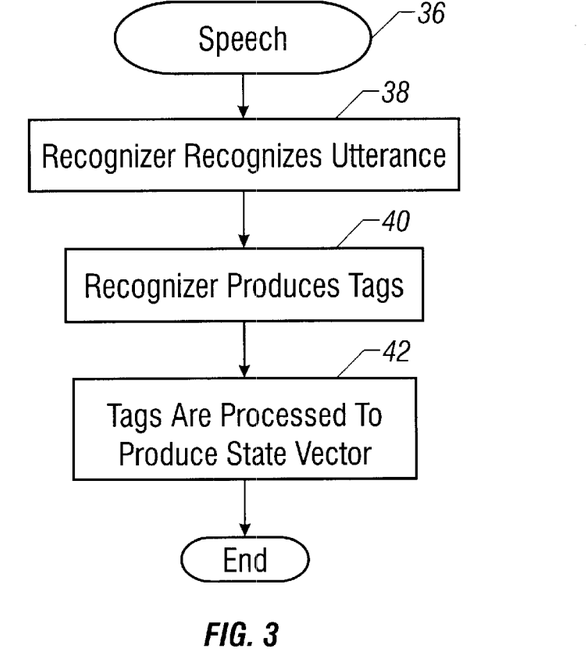
FIG. 3 is a flow chart for software for providing speech recognition in accordance with one embodiment of the present invention.

Turning next to FIG. 3, software 36 for speech recognition involves the use of an application program interface (API) in one embodiment of the present invention. For example, the JAVA speech API may be utilized in one embodiment of the present invention. Thus, as indicated in block 38, initially the API recognizes an utterance as spoken by the user. The API then produces tags as indicated in block 40. These tags are then processed to produce the state vector as indicated in block 42.

In one embodiment of the present invention, the JAVA speech API may be the ViaVoice software available from IBM Corporation. Upon recognizing an utterance, the JAVA speech API recognizer produces an array of tags. Each tag is a string. These strings do not represent the words the user spoke but instead they are the strings attached to each production rule in the grammar. These tags are language independent strings representing the meaning of each production rule. For example, in a time grammar, the tags representing the low order minute digit may include text which has no meaning to the recognizer. For example, if the user speaks "five", then the recognizer may include the tag "minute: 5" in the tag array.

Figure 4:
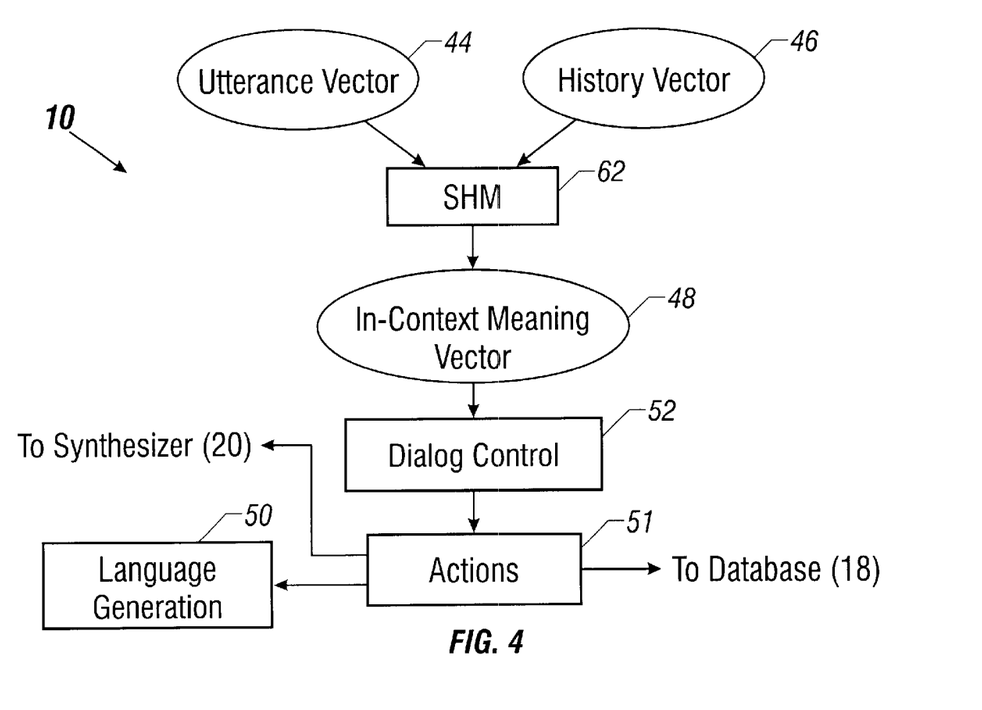
FIG. 4 is a schematic depiction of the operation of one embodiment of the present invention including the generation of in-context meaning and dialog control.

The natural language understanding (NLU) unit 10 develops what is called an in-context meaning vector 48 indicated in FIG. 4. This is a combination of the utterance vector developed by the recognizer 21 together with the history vector 46. The history vector includes information about what the user said in the past together with information added by the system in the process of servicing a query. The utterance vector may be a class file in embodiment using JAVA. The history vector 46 and a utterance vector 44 may be merged by structural history management software 62 to create the in-context meaning vector 48. The history, utterance and in-context meaning vectors are state vectors.

The in-context meaning vector 48 is created by decoding and replacing pronouns which are commonly used in conversational speech. The in-context meaning vector is then used as the new history vector. Thus, the system decodes the pronouns by using the speech history vector to gain an understanding of what the pronouns mean in context.

The in-context meaning vector 48 is then provided to dialog control software 52. The dialog control software 52 uses a dialog control file to control the flow of the conversation and to take certain actions in response to the in-context meaning vector 48.

These actions may be initiated by an actions object 51 that communicates with the database 18 and a language generator module 50. Prior to the language generator module 50, the code is human language independent. The module 50 converts from a computer format to a string to a particular human understood language, like English. The action object 51 may call the synthesizer 20 to generate speech. The actions object 51 may have a number of methods (see Table I infra).

Figure 5:
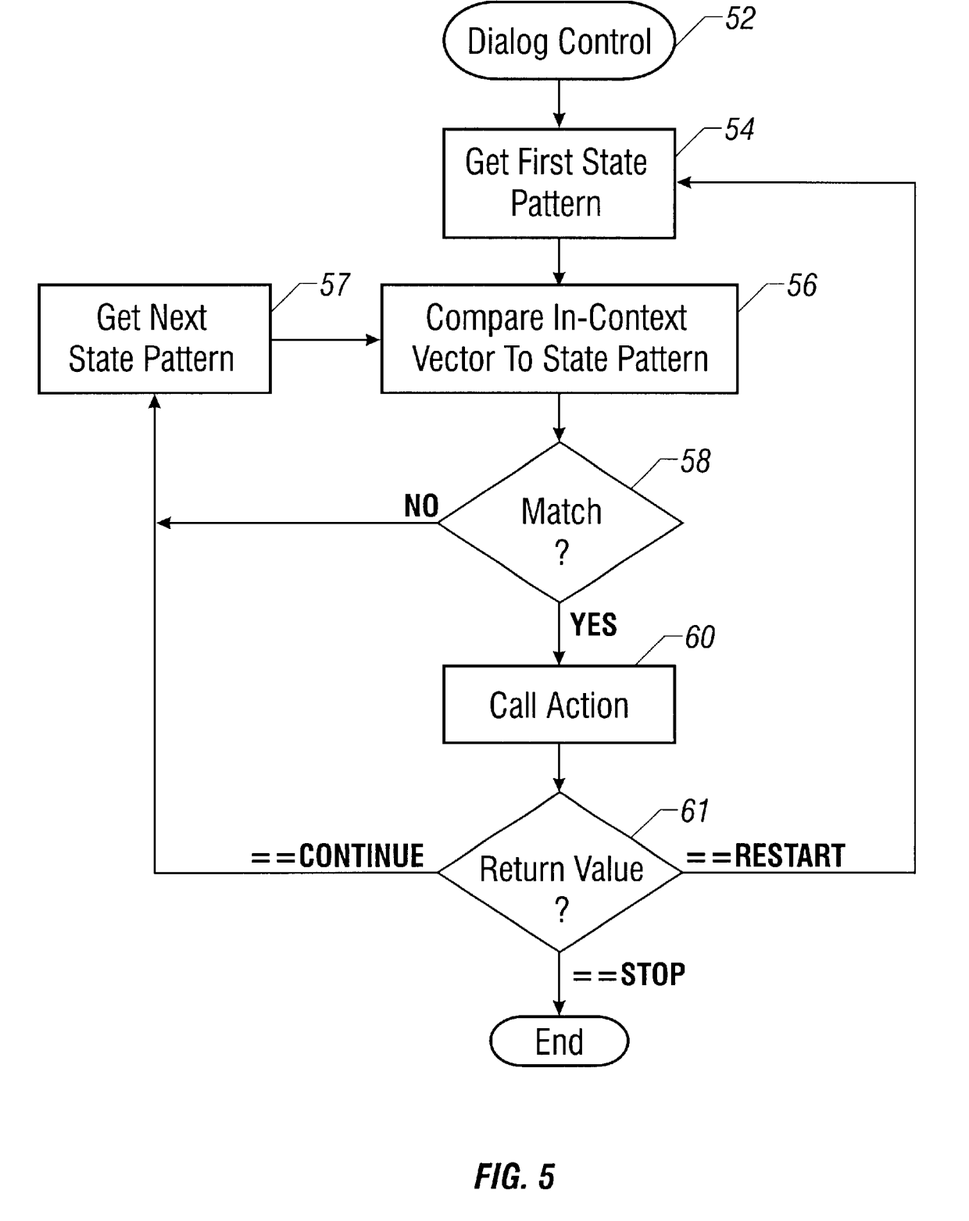
FIG. 5 is a flow chart for software for implementing dialog control in accordance with one embodiment of the present invention.

Thus, referring to FIG. 5, the dialog control software 52 initially executes a state control file by getting a first state pattern as indicated in block 54 in one embodiment of the invention. Dialog control gives the system the ability to track topic changes.

The dialog control software 52 uses a state pattern table (see Table I below) in one embodiment of the present invention. Each row in the state pattern table is a state pattern and a function. The in-context meaning vector 48 is compared to the state pattern table one row at a time going from top to bottom (block 56). If the pattern in the table row matches the state vector (diamond 58), then the function of that row is called (block 60). The function is also called a semantic action.

Each semantic action can return one of three values: CONTINUE, STOP and RESTART as indicated at diamond 61. If the CONTINUE value is returned, the next state pattern is obtained, as indicated at block 57, and the flow iterates. If the RESTART value is returned, the system returns to the first state pattern (block 54). If the STOP value is returned, the system's dialog is over and the flow ends.

The action may do things such as speak to the user and perform database queries. Once a database query is performed, an attribute may be added to the state vector which has the records returned from the query as a value. Thus, the patterns consist of attribute, value pairs where the attributes in the state pattern table correspond to the attributes in the state vector. The values in the pattern are conditions applied to the corresponding values in the state vector.

TABLE I

| | Request | Title | Channel | Time | nfound | function |
|---|---|---|---|---|---|---|
| 1 | Request | Title | Channel | Time | nfound | function |
| 2 | Help | | | | | giveHelp |
| 3 | Tv_on | | | | | turnOnTV |
| 4 | Tv_off | | | | | turnOffTV |
| 5 | tune | | | exists | | tuneTV |
| 6 | | | | | not exists | defaultTime |
| 7 | | | | | | checkDBLimits |
| 8 | | | | | | queryDB |
| 9 | | | | | 0 | relaxConstraints |
| 10 | | | | | −1 | queryDB |
| 11 | | | | | 0 | saySorry |
| 12 | | | | | 1 | giveAnswer |
| 13 | | | | | >1 | giveChoice |

Thus, in the table above, the state patterns at lines 2–5 are basic functions such as help, turn the television on or off and tune the television and all return a STOP value.

In row six, the state pattern checks to see if the time attribute is defined. If not, it calls a function called defaultTime( ) to examine the request, determine what the appropriate time should be, and set the time attribute, and return a CONTINUE value.

In row seven, the pattern is empty so the function checkDBLlimits( ) is called. A time range in the user's request is checked against the time range spanned by the database. If the user's request extends beyond the end of the database, the user is notified, and the time is trimmed to fit within the database range. A CONTINUE value is returned.

Row eight calls the function queryDB( ). QueryDB( ) transforms the state vector into an SQL query, makes the query, and then sets the NFOUND variable to the number of records retrieved from the database. The records returned from the query are also inserted into the state vector.

At row nine a check determines if the query done in row eight found anything. For example, the user may ask, "When is the X-Files on Saturday?", when in fact the X-Files is really on Sunday. Rather than telling the user that the X-Files is not on, it is preferable that the system say that "the X-Files is not on Sunday, but is on Sunday at 5:00 p.m". To do this, the constraints of the user's inquiry must be relaxed by calling the function relaxConstraints( ). This action drops the time attribute from the state vector. If there were a constraint to relax, relaxConstraints( ) sets NFOUND to −1. Otherwise, it leaves it at zero and returns a CONTINUE value.

Row 10 causes a query to be repeated once the constraints are relaxed and returns a CONTINUE value. If there were no records returned from the query, the system gives up and tells the user of its failure in row 11 and returns a STOP value. In row 12 an answer is composed for the user if one record or show was found and a STOP value is returned.

In row 13, a check determines whether more than one response record exists. Suppose X-Files is on both channels 12 and 25. GiveChoice( ) tells the user of the multiple channels and asks the user which channel the user is interested in. GiveChoice( ) returns a STOP value (diamond 61, FIG. 5), indicating that the system's dialog turn is over. If the user tells the system a channel number, then the channel number is merged into the previous inquiry stored in history.

The system tracks topic changes. If the user says something that clears the history, the state pattern table simply responds to the query according to what the user said. The state pattern table responds to the state stored in the in-context vector.

Figure 6:
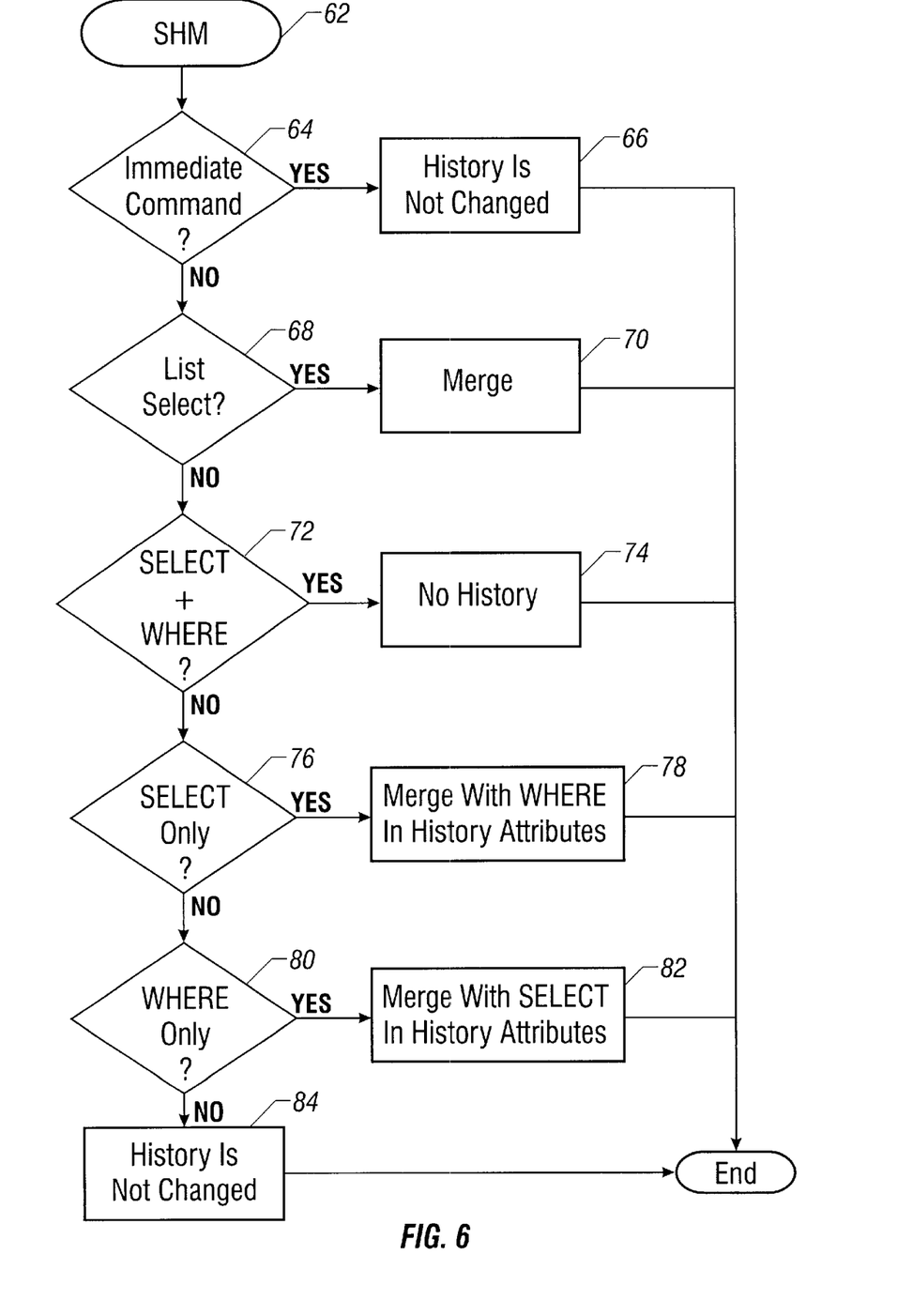
FIG. 6 is a flow chart for software for implementing structure history management in accordance with one embodiment of the present invention.

Turning next to FIG. 6, the software 62 implements structural history management (SHM). Initially the flow determines at diamond 64 whether an immediate command is involved. Immediate commands are utterances that do not query the database but instead demand immediate action. They do not involve pronouns and therefore do not require the use of structural history. An example would be "Turn on the TV". In some cases, an immediate command may be placed between other types of commands. The immediate command does not effect the speech history. This permits the following sequence of user commands to work properly:

1. "When is X-Files on",
2. "Turn on the TV",
3. "Record it".

The first sentence puts the X-Files show into the history. The second sentence turns on the television. Since it is an immediate command, the second sentence does not erase the history. Thus, the pronoun "it" in the record command (third sentence) can be resolved properly.

Thus, referring back to FIG. 6, if an immediate command is involved, the history is not changed as indicated in block 66. Next, a check at diamond 68 determines whether a list selection is involved. In some cases, a query may be responded to with a list of potential shows and a request that the user verbally select one of the listed shows. The system asks the user which title the user is interested in. The user may respond that it is the Nth title. If the user utterance selects a number from a list, then the system merges with history as indicated in block 70. Merging with history refers to an operation in which the meaning derived from the speech recognizer is combined with history in order to decode implicit references such as the use of pronouns.

Next, a check at diamond 72 determines whether the query includes both SELECT and WHERE variable. If so, history is not needed to derive the in-context meaning as indicated in block 74.

Otherwise, a check determines whether the utterance includes only SELECT (diamond 76) or only WHERE (diamond 80) variables. If only a SELECT variable is involved, the utterance vector is merged with the history vector.

Similarly, if the utterance includes only a WHERE variable, the utterance is merged with history as indicated in block 82. If none of the criteria set forth in diamonds 64, 68, 72, 76 or 80 apply, then the history is not changed as indicated in block 84.

As an example, assume that the history vector is as follows:

Request: When (from "When is X-Files on this afternoon?")

Title: X-Files

Part_of_day_range: afternoon.

Thus the history vector records a previous query "When is X-Files on this afternoon?". Thereafter, the user may ask "What channel is it on?" which has the following attributes:

Request: Channel (from "What channel is it on?")

Thus, there is a SELECT attribute but no WHERE attribute in the user's query. As a result, the history vector is needed to create an in-context or merged meaning as follows:

Request: Channel (from "What channel is X-Files on this afternoon?")

Title: X-Files

Part_of_day_range: afternoon.

Notice that the channel request overwrote the when request.

As another example, assume the history vector includes the question "What is X-Files about?" which has the following attributes:

Request: About (from "What is X-Files about?")

Title: X-Files

Assume the user then asks "How about Xena?" which has the following attributes:

Title: Xena (from "How about Xena?")

The query results in an in-context meaning as follows when merged with the history vector:

Request: About (from "What is Xena about?")

Title: Xena.

Since there was no SELECT variable obtainable from the user's question, the SELECT variable was obtained from the historical context (i.e. from the history vector). Thus, in the first example, the WHERE variable was missing and in the second variable the SELECT variable was missing. In each case the missing variable was obtained from history to form an understandable in-context meaning.

If an utterance has only a WHERE variable, then the in-context meaning vector is the same as the history vector with the utterance's WHERE variable inserted into the history vector. If the utterance has only a SELECT variable, then the in-context meaning is the same as the history vector with the utterance's SELECT variable inserted into the history vector. If the utterance has neither a SELECT or a WHERE variable, then the in-context meaning vector is the same as the history vector. If the utterance has both parts, then the in-context meaning is the same as that of the utterance and the in-context meaning vector becomes the history vector.

Similarly, if the utterance includes only a WHERE variable, the utterance is merged with history as indicated in block 82. If none of the criteria set forth in diamonds 64, 68, 72, 76 or 80 apply, then the history is not changed as indicated in block 84.

Figure 7:
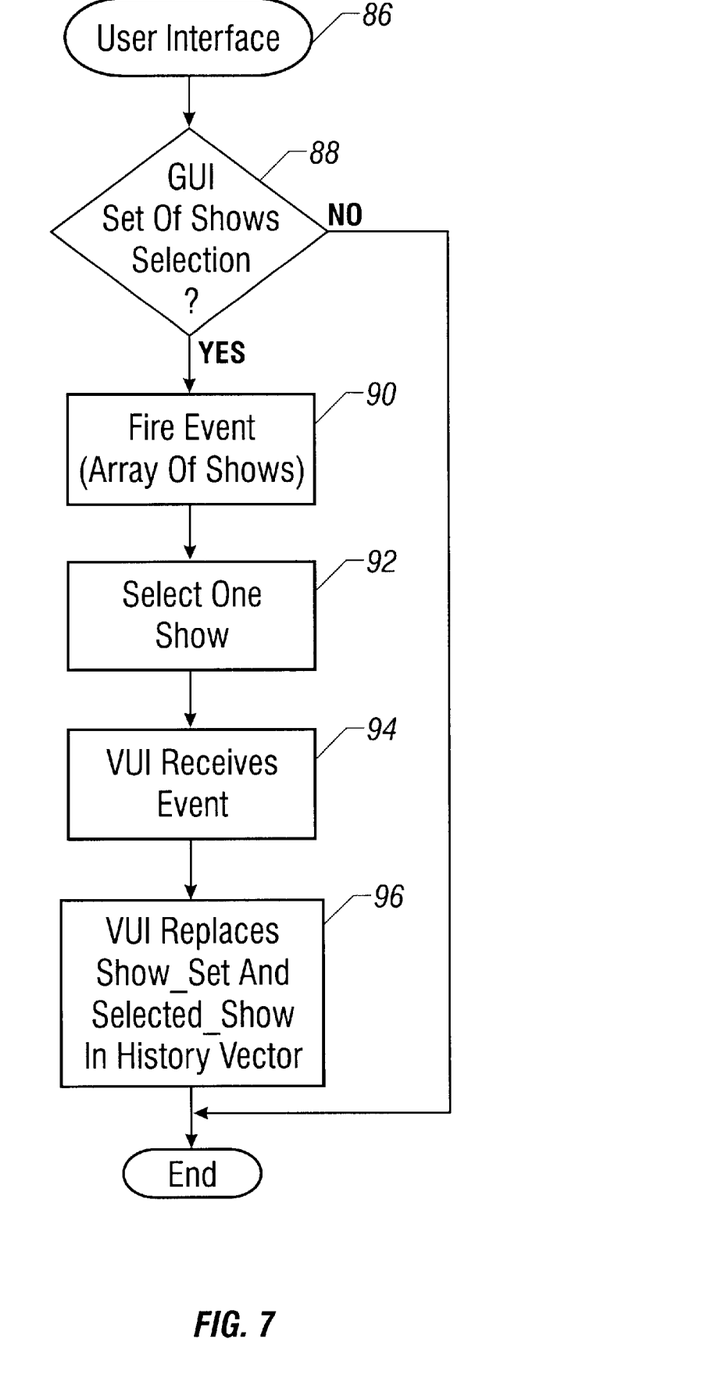
FIG. 7 is flow chart for software for implementing an interface between a graphical user interface and a voice user interface in accordance with one embodiment of the present invention.

The software 86, shown in FIG. 7, coordinates actions between the graphical user interface and the voice user interface in one embodiment of the invention. A show is a television show represented by a database record. A show is basically a database record with attributes for title, start time, end time, channel, description, rating and genre.

More than one show is often under discussion. A collection of shows is represented by a ShowSet. The SHOW_SET attribute is stored in the meaning vector under the SHOW_SET attribute. If only one show is under discussion, then that show is the SHOW_SET.

If the user is discussing a particular show in the SHOW_SET, that show is indicated as the SELECTED_SHOW attribute. If the attribute is −1, or missing from the meaning vector, then no show in the SHOW_SET has been selected. When the voice user interface produces a ShowSet to answer a user's question, SHOW_SET and SELECTED_SHOW are set appropriately. When a set of shows is selected by the graphical user interface 14, it fires an event containing an array of shows. Optionally, only one of these shows may be selected. Thus, referring to diamond 88, if the user selects a set of shows, an event is fired as indicated in block 90. In block 92, one of those shows may be selected. When the voice user interface 12 receives the fired event (block 94), it simply replaces the values of SHOW_SET and SELECTED_SHOW (block 96) in the history vector with those of a synchronization event.

When the voice user interface 12 translates a meaning vector into the appropriate software language, the statement is cached in the history vector under the attributes. This allows unnecessary database requests to be avoided. The next time the history vector is translated, it is compared against the cached value in the history vector. If they match, there is no need to do the time consuming database query again.

The conversational model 100 (FIG. 8) implemented by the system accounts for two important variables in obtaining information about television programming: time and shows. A point in time may be represented by the JAVA class calendar. A time range may be represented by a time range variable. The time range variable may include a start and end calendar. The calendar is used to represent time because it provides methods to do arithmetic such as adding hours, days, etc.

The time range may include a start time and end time either of which may be null indicating an open time range. In a state vector, time may be represented using attributes such as a WEEK_RANGE which includes last, this and next; DAY_RANGE which includes now, today, tomorrow, Sunday, Monday . . . , Saturday, next Sunday . . . , last Sunday . . . , this Sunday . . . ; PART_OF_DAY_RANGE which includes this morning, tonight, afternoon and evening; HOUR which may include the numbers one to twelve; MINUTE which may include the numbers zero to fifty-nine; and AM_PM which includes AM and PM.

Thus, the time attributes may be composed to reflect a time phase in the user's utterance. For example, in the question, "Is Star Trek on next Monday at three in the afternoon?" may be resolved as follows:

Request: When

Title: Star Trek

Day_Range: Next Monday

Part_of_Day_Range: Afternoon

Hour: 3

Since the state vector is a flat data structure in one embodiment of the invention, it is much simpler and uses simpler programming. The flat data structure is made up of attribute, value pairs. For example, in the query "When is X-Files on this afternoon?" the request is the "when" part of the query. The request is an attribute whose value is "when". Similarly, the query has a title attribute whose value is the "X-Files". Thus, each attribute, value pair includes a name and a value. The data structure may be simplified by ensuring that the values are simple structures such as integers, strings, lists or other database records as opposed to another state vector.

In this way, the state vector contains that information needed to compute an answer for the user. The linguistic structure of the query, such as whether it is a phrase, a clause or a quantified set, is deliberately omitted in one embodiment of the invention. This information is not necessary to compute a response. Thus, the flat data structure provides that information and only that information needed to formulate a response. The result is a simpler and more useful programming structure.

Figure 8:
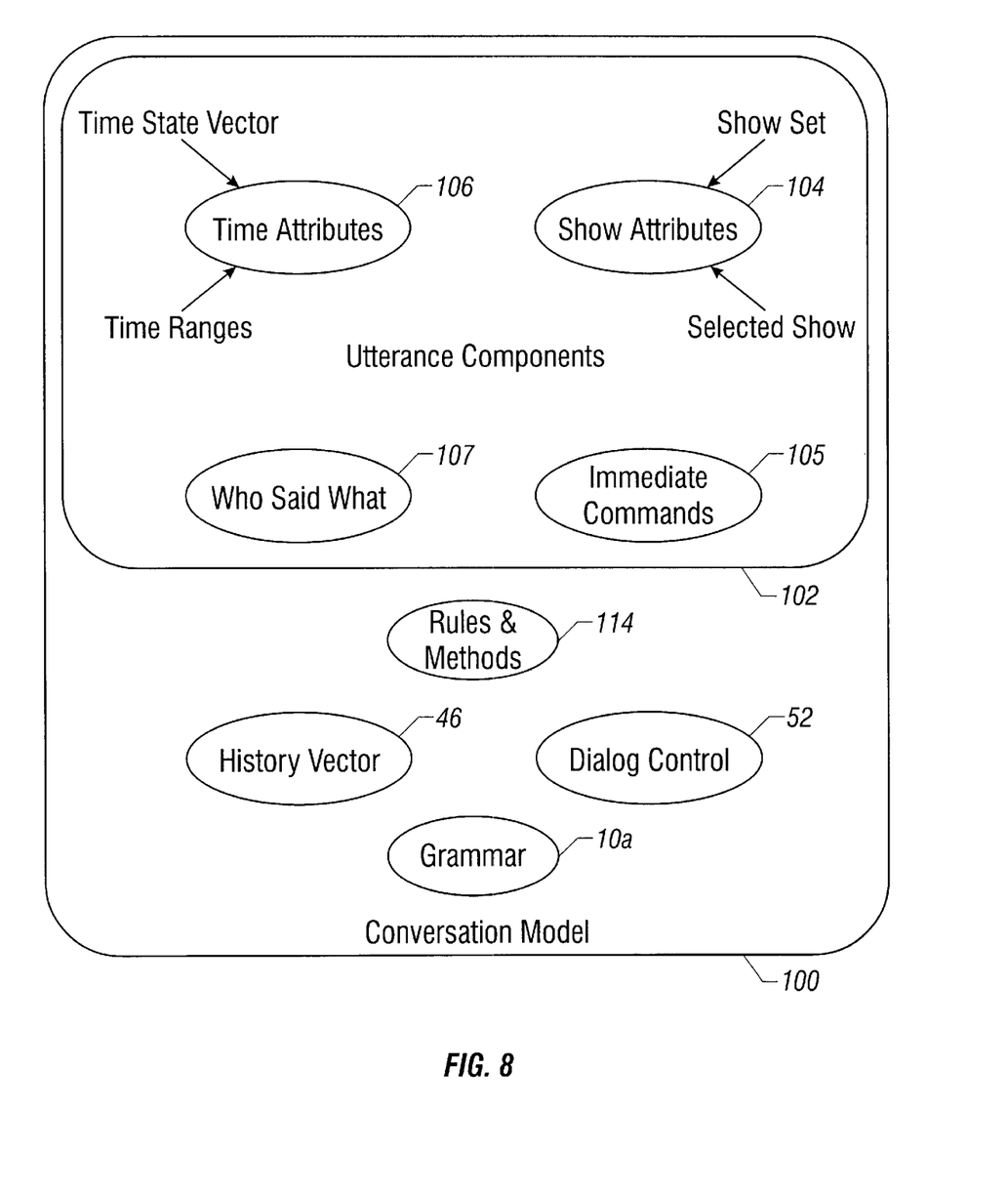
FIG. 8 is a conversation model implemented in software in accordance with one embodiment of the present invention.
Figure 8A:
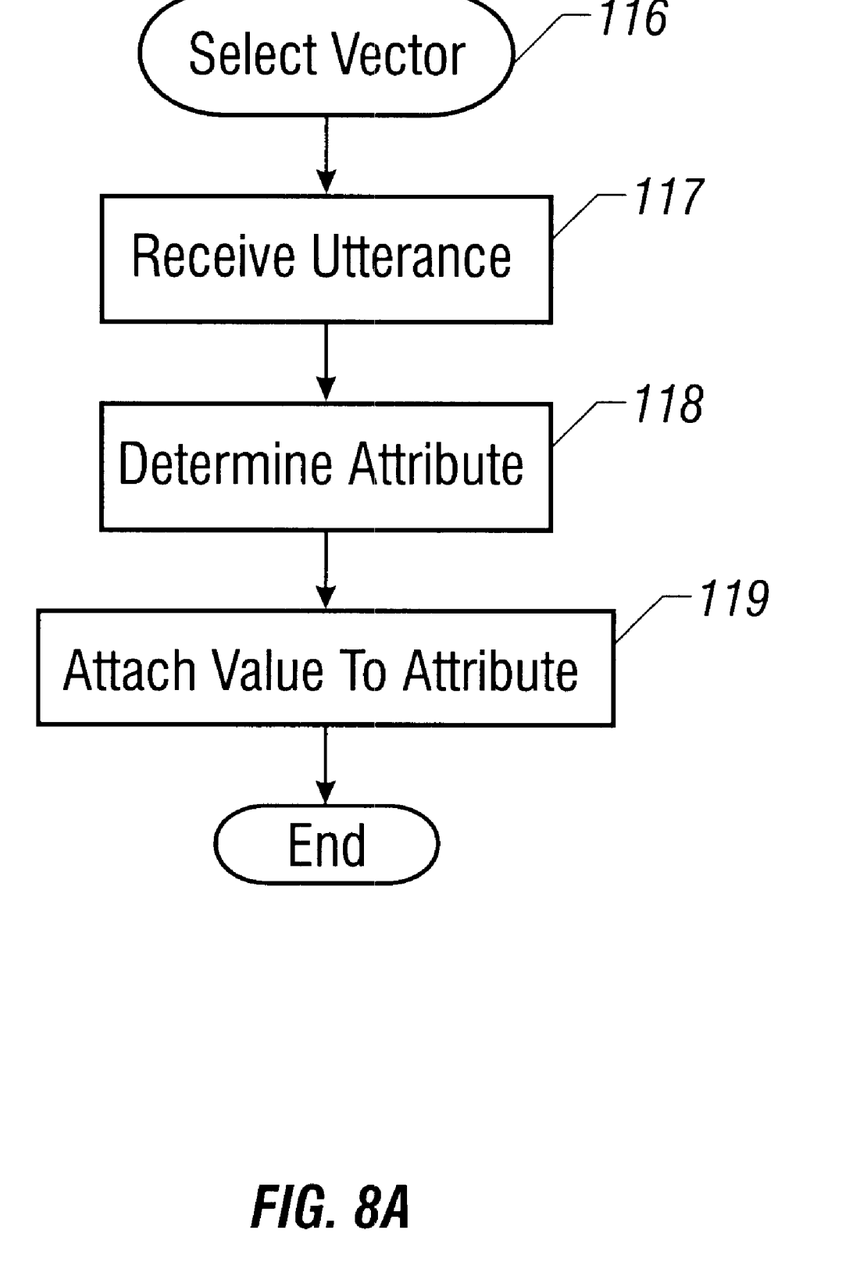
FIG. 8A is a flow chart for software for creating state vectors in one embodiment of the present invention.

The software 116 for creating the state vector, shown in FIG. 8A in accordance with one embodiment of the present invention, receives the utterance as indicated in block 117. An attribute of the utterance is determined as indicated in block 118. A non-state vector value is then attached to the attribute, value pair, as indicated in block 119.

Thus, referring again to FIG. 8, the conversation model 100 may include time attributes 106 which may include time ranges and a time state vector. Show attributes 104 may include a show set and selected show. The time attributes and show attributes are components of an utterance. Other components of the utterance may be "who said what" as indicated at 107 and immediate commands as indicated at 105. The conversation model may also include rules and methods 114 discussed herein as well as a history vector 46, dialog control 52 and a grammar 10*a*.

The methods and rules 114 in FIG. 8 may include a number of methods used by the unit 10. For example, a method SetSelected( ) may be used by the unit 10 to tell the voice user interface 12 what shows have been selected by the graphical user interface 14. The method Speak( ) may be used to give other parts of the system, such as the graphical user interface 14, the ability to speak. If the synthesizer 20 is already speaking, then a Speak( ) request is queued to the synthesizer 20 and the method returns immediately.

The method SpeakIfQuiet( ) may be used by the unit 10 to generate speech only if the synthesizer 20 is not already speaking. If the synthesizer is not speaking, the text provided with the SpeakIfQuiet( ) method may be given to the synthesizer 20. If the synthesizer is speaking, then the text may be saved, and spoken when the synthesizer is done speaking the current text.

A natural language understanding unit 10 may also be used to control the accessing of audio/visual information. Software that implements an electronic program guide function may also be utilized to control the accessing of audio/video programming.

Figure 9:
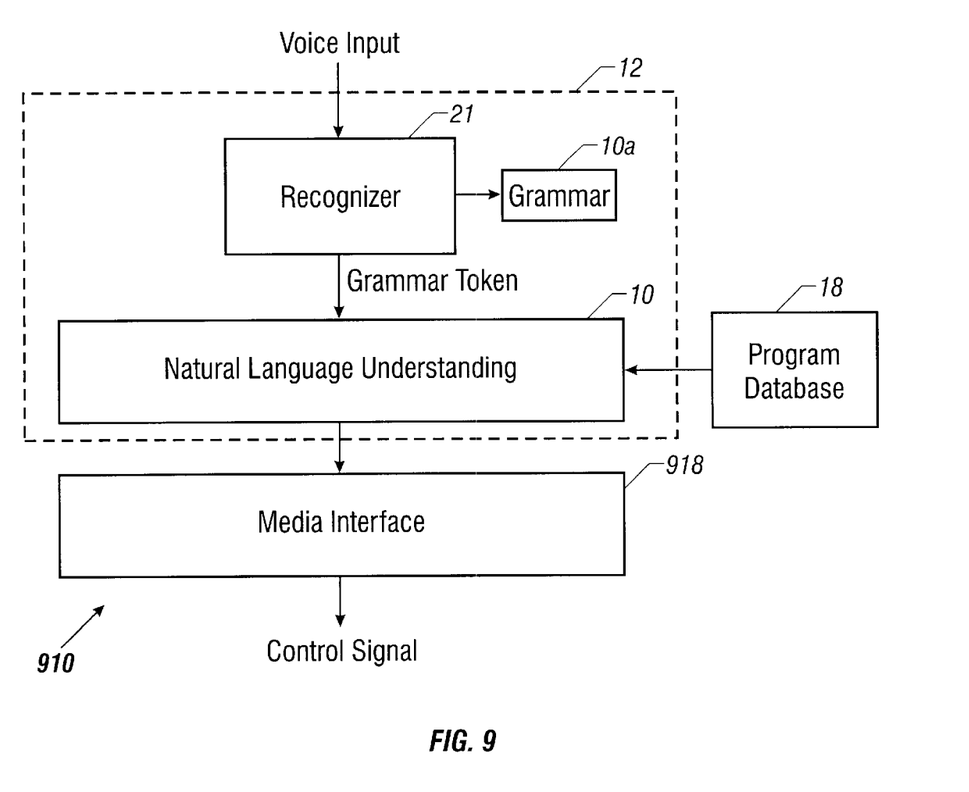
FIG. 9 is schematic depiction of software modules utilized in accordance with another embodiment of the present invention.

Referring to FIG. 9, the voice user interface 12 may include a grammar 10*a* as described previously. The recognizer 21 receives a voice input and attempts to match the words in the voice input to the words contained in the grammar 10*a*. When a match is identified, a grammar token may be issued by the recognizer 21 to a natural language understanding unit 10. The token identifies the particular phrase from the grammar which was identified in the voice input. The natural language understanding unit 10 may provide a voice output through a voice synthesizer 20 in one embodiment of the present invention.

The natural language understanding unit 10 works with a program database 18. The program database 18 may be provided from a number of sources. In one embodiment of the present invention, the program database information is downloaded from video programming content providers.

The natural language understanding unit 10 converts the grammar token into a command recognized by a media interface 918. The media interface 918 then issues a media control signal in a format acceptable by a media playback device. In some embodiments of the present invention, the media control signal may be issued by a infrared interface. However, other formats may be utilized including a cable connection or a radio wave interface.

Figure 10:
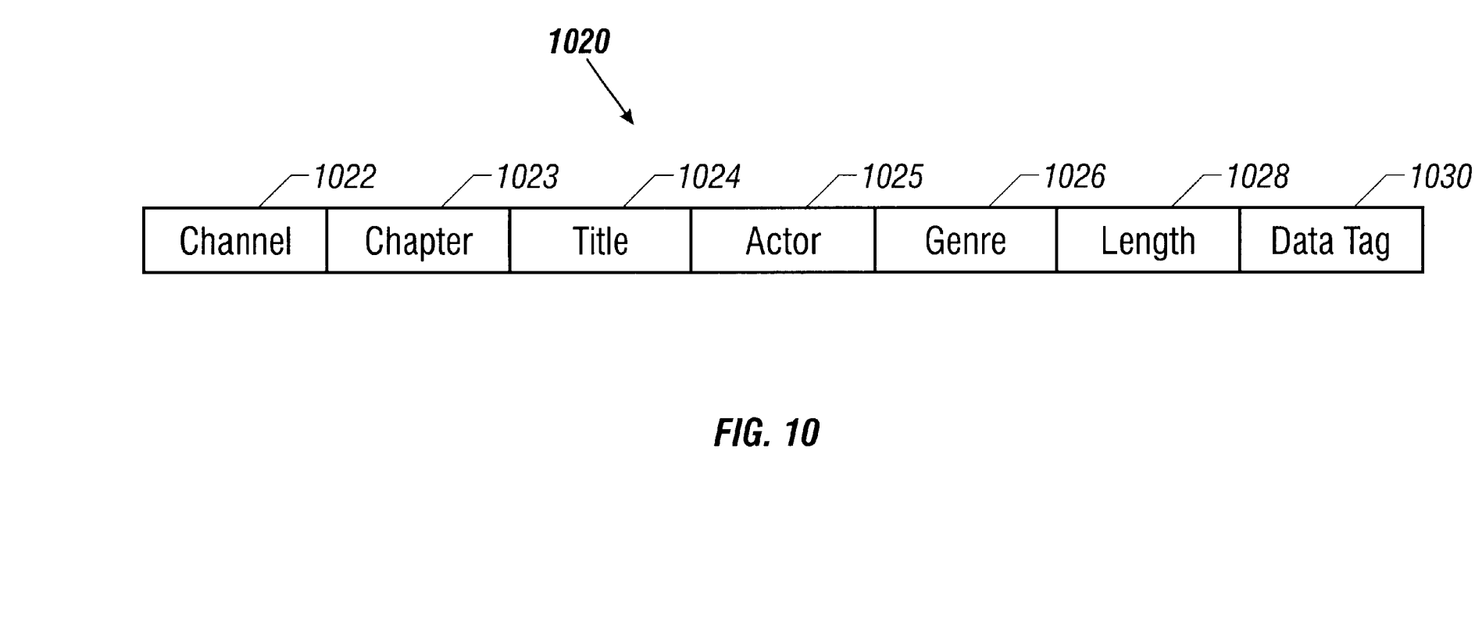
FIG. 10 is a data format which may be utilized in connection with the software module shown in FIG. 9.

Information about each of a plurality of programs may be derived from the program database 18 to produce a file 1020 shown in FIG. 10 for each user requestable portion of an audio/visual program. For example, in one embodiment of a present invention, a file 1020 may include a data tag 1030 which provides a reference or pointer to the location where the data forming the actual program portion is stored. The file 1020 may include fields containing information about the program including the channel 1022, title 1024, actors 1025, genre 1026, and length 1028, as examples. Of course, other information may be included as well.

In order to enable a user to access and playback a particular portion of an audio/visual program, information may be included in the file 1020 associated with that portion which identifies the location of such portions. For example information may be provided in the field 1023 about the location of chapters within a audio/visual program.

Similarly, information about other portions may be provided as well. For example, a content provider may provide an index of information about the location of scenes, episodes, chapters or other portions of the audio/visual information. This information may stored as part of the file 1020. Then the collection of files 1020, forming a part of the database 18, may be searched to identify a particular portion.

The portion identifying information, culled from the files 1020, may provide the location within the stored data (identified by the data tag 1030 for example) of the portion. The portion identifying information may also include additional identifying information such as the title of the corresponding portion. This title may then be the subject of a conversational query. For example, the user may speak the name of a portion or chapter the user wishes to obtain and the system may identify that portion by searching through the files 1020, for example checking the chapter field 1023 for a query match.

In one embodiment of the present invention, the files 1020 form a searchable database which may be searched to obtain information orally requested by the user. In an embodiment in which the files are automatically provided from the content provider, the system 910 advantageously provides an automatic indexing of the audio or video data for each program stored by the system.

Figure 11:
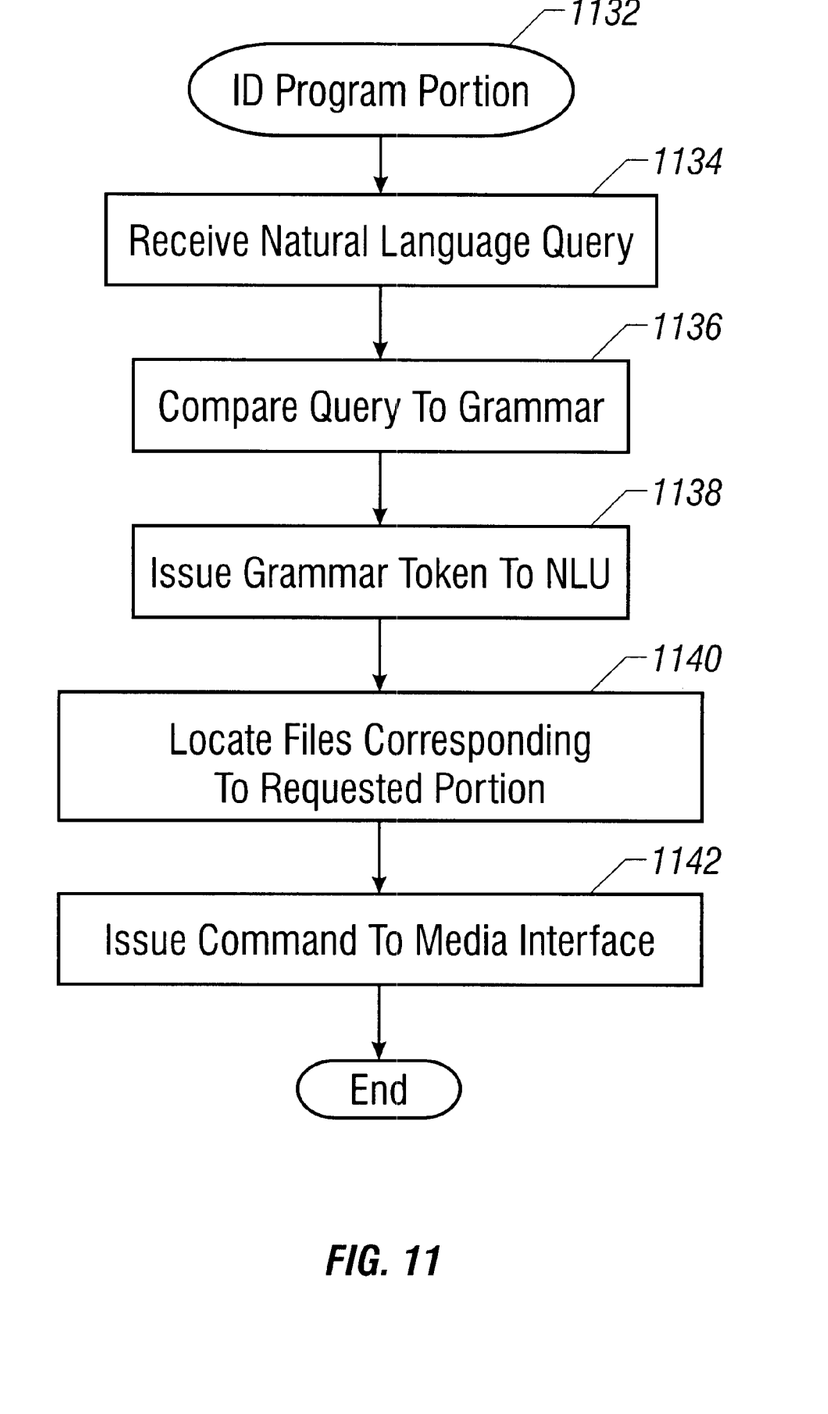
FIG. 11 is a flow chart for software for selecting a portion in an audio/visual program.

In accordance with one embodiment of the invention, software 1132 to access a portion a program in response to a conversational request, shown in FIG. 11, begins by receiving a natural language query as indicated at block 1134. The query is then compared to the grammar 10a as indicated in block 1136. A grammar token is issued to identify the particular grammar file that matched the natural language query as indicated in block 1138. The token is issued to the natural language understanding unit 10.

The natural language understanding unit 10 then conducts a search to locate the files corresponding to the requested portion (block 1140). That is, the natural language understanding unit 10 causes the initiation of a search through the files 1020 in the database 18 to find fields identifying the requested portion. In the case of a search for a chapter within a set of recorder audio/visual program, the search may be conducted to find a match between the spoken query and the data contained in the chapter field 1023. Once appropriate portions are identified in this fashion, a command may be issued to the media interface 918 to initiate the requested playback (block 1142).

In addition to searching for chapter names or numbers, the system may identify and access information based on a time or relative position relationship. For example, the user may request that the system "skip ahead one minute", "skip back one minute", "go to the start of the program", "move to the five minute mark", "skip the first five minutes of the program", "fast forward", "rewind", or the like. In addition, key words in a portion field such as the field 1023 may be searched. As still another alternative, key words extracted from closed caption text may be searched to identify a portion for replay in response to conversational requests.

Figure 12:
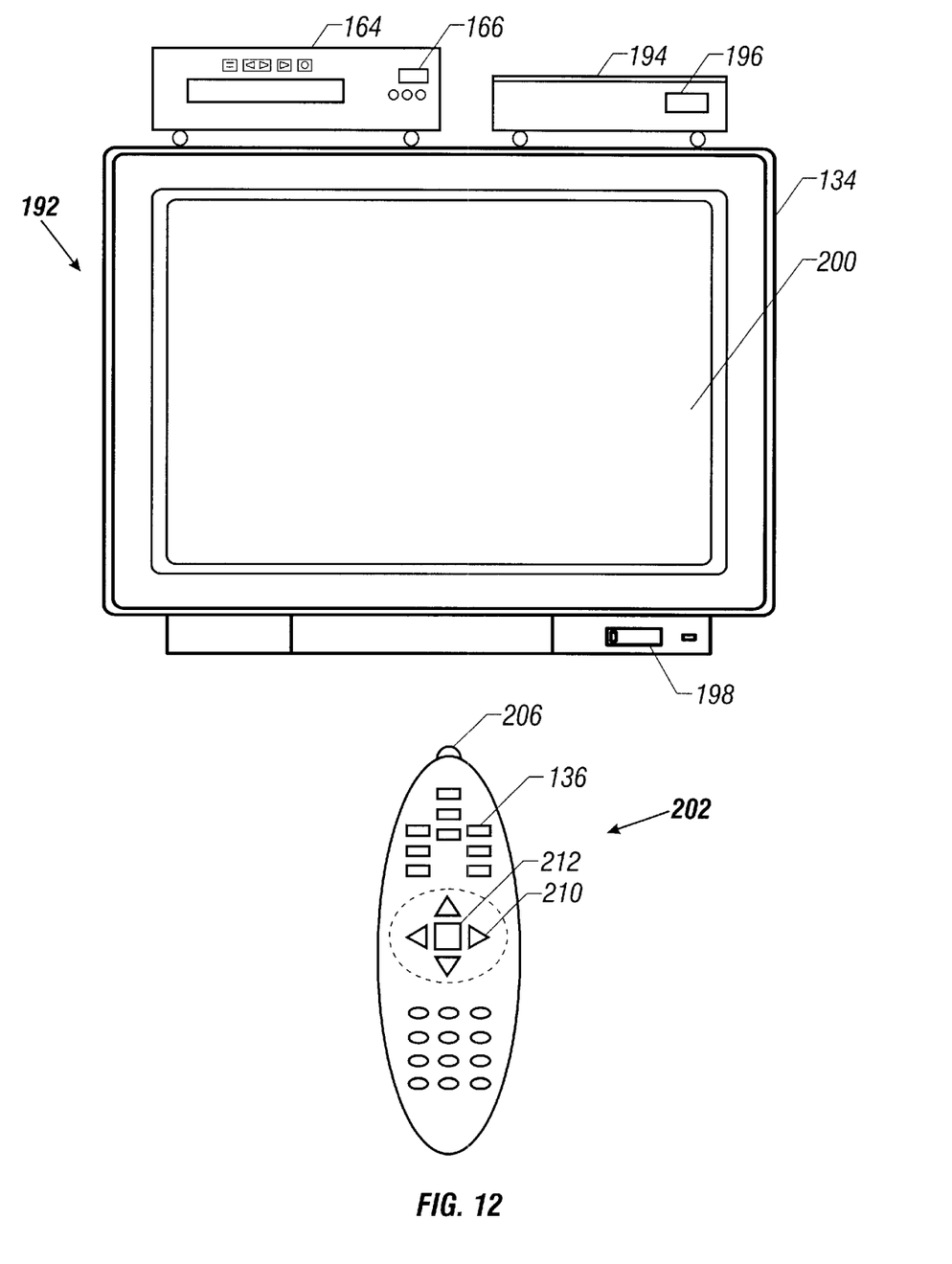
FIG. 12 is a front elevational view of one embodiment of the present invention.

As shown in FIG. 12, the system 192 may include a television 134 with a display screen 200. A set-top box 194 may be positioned atop the display screen 200. A infrared interface 196 may be provided in connection with the set-top box 194. An infrared interface 198 may be provided on the television 134.

A audio/visual playback device 164 may be also positioned in association with the television 134. The device 164 may be one which includes an infrared interface 166 as illustrated. A variety of devices 164 may be utilized in connection with the present invention including those that play analog as well as digital recordings. A conventional VCR may be utilized as well as any device which stores video programming in association with a digital storage media such as a random access memory. For example, a hard disk drive may be utilized to store video programming as is currently done in connection with the commercially available systems known as TiVo and available from TiVo, Inc., Sunnyvale, Calif.

The system may be controlled remotely by a remote control unit 202 which includes arrow control buttons 210, an enter button 212 and an infrared interface 206 in one embodiment of the invention. A microphone 136 may be provided within the remote control unit 202 to better receive the input voice commands with less interference from the television.

In some cases, using legacy systems, there may be problem with adequately determining the state of a device controlled by the remote control unit 202. This is particularly so where multiple remote control units are available for controlling various components. A variety of systems have been provided to overcome this deficiency. For example, with a bi-directional infrared protocol, this problem is easily overcome since the system may always maintain the state of each component.

Figure 13:
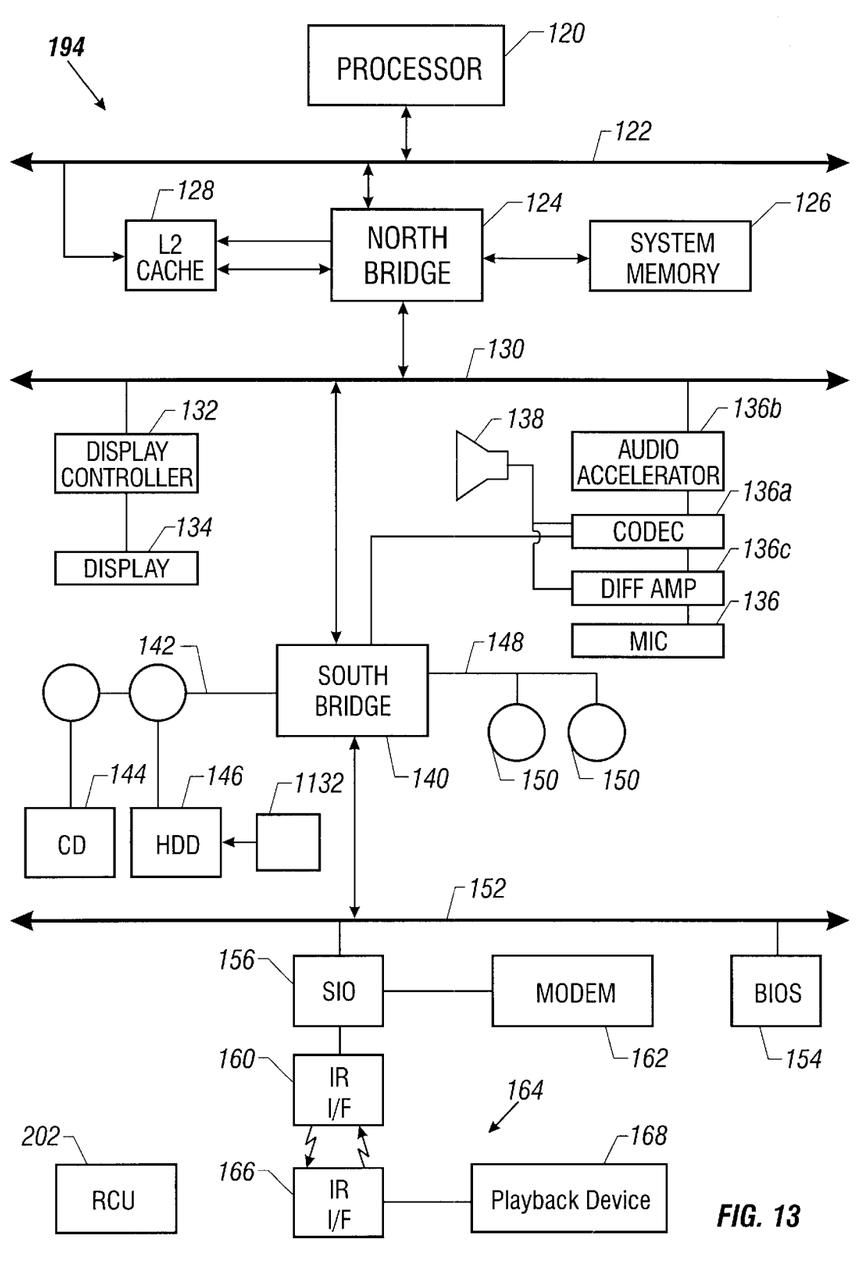
FIG. 13 is a schematic of depiction hardware for implementing one embodiment of the present invention.

One embodiment of a processor-based system 194 for implementing the capabilities described herein, shown in FIG. 13, may include a processor 120 that communicates across a host bus 122 to a bridge 124, an L2 cache 128 and system memory 126. The bridge 124 may communicate with a bus 130 which could, for example, be a Peripheral Component Interconnect (PCI) bus in accordance with Revision 2.1 of the PCI Electrical Specification available from the PCI Special Interest Group, Portland, Oreg. 97214. The bus 130, in turn, may be coupled to a display controller 1732 which drives a display 134 in one embodiment of the invention.

The display 134 may be a conventional television. In such case, the hardware system shown in FIG. 13 may be implemented as a set-top box 194 as shown in FIG. 12. The set-top box 194 sits on and controls a conventional television display 134.

A microphone input 136 may lead to the audio codec (AC'97) 136a where it may be digitized and sent to memory through an audio accelerator 136b. The AC'97 specification is available from Intel Corporation (www.developer.intel.com/pc-supp/webform/ac97). Sound data generated by the processor 120 may be sent to the audio accelerator 136b and the AC'97 codec 136a and on to the speaker 138.

In some embodiments of the present invention, there may be a problem distinguishing user commands from the audio that is part of the television program. In some cases, a mute button may be provided, for example in connection with a remote control 202, in order to mute the television audio when voice requests are being provided.

In accordance with another embodiment of the present invention, a differential amplifier 136c differences the audio output from the television signal and the input received at the microphone 136. This reduces the feedback which may occur when audio from the television is received by the microphone 136 together with user spoken commands.

In some embodiments of the present invention, a microphone 136 may be provided in a remote control unit 202 which is used to operate the system 194, as shown in FIG. 12. For example, the microphone input may be transmitted through a wireless interface 206 to the processor-based system 192 and its wireless interface 196 in one embodiment of the present invention. Alternatively, the remote control unit 202 may interface with the television receiver 134 through its wireless interface 198.

The bus 130 may be coupled to a bus bridge 140 that may have an extended integrated drive electronics (EIDE) coupling 142 in and Universal Serial Bus (USB) coupling 148 (i.e., a device compliant with the Universal Serial Bus Implementers Form Specification, Version 1.0 (www.usb.org)). Finally, the USB connection 148 may couple to a series of USB hubs 150.

The EIDE connection 142 may couple to a hard disk drive 146 and a CD-ROM player 144. In some embodiments, other equipment may be coupled including a video cassette recorder (VCR) and a digital versatile disk (DVD) player, not shown.

The bridge 140 may in turn be coupled to an additional bus 152, which may couple to a serial interface 156 which drives a infrared interface 160 and a modem 162. The interface 160 may communicate with the remote control unit 202. A basic input/output system (BIOS) memory 154 may also be coupled to the bus 152.

The infrared interface 160 may communicate with the remote control unit 202 and the playback device 164. The device 164 may include an infrared interface 166 and an audio/visual playback unit 168. In one embodiment of the present invention, the interfaces 160 and 166 implement a bi-directional infrared interface. Again, the device 164 may be an analog system for example using magnetic tape or a digital system using a random access memory such as a hard disk drive or a re-recordable digital video disk (DVD) drive.

The device 164 may also be a part of the overall computer system 194 and may be coupled to the couplings 142 or 148 as examples. That is, the device 164 may actually be internal to the processor-based system 194 in one embodiment of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a speech recognizer that recognizes a spoken request to play a portion of an audio/visual program displaced from the current position by a spoken amount of time; and
   an interface that converts the recognized request to a format compatible with the audio/visual playback of a video recording device.

2. The system of claim 1 wherein said speech recognizer parses a select clause and a where clause from the request.

3. The system of claim 1 including a memory that stores a meaning derived from said speech recognizer and historical information about previously recognized speech and uses the historical information to correct the meaning derived from said speech recognizer.

4. The system of claim 3 including a unit that determines whether a request includes two different types of variables and if so, does not use the historical information to alter the meaning derived from said speech recognizer.

5. The system of claim 4 wherein said unit determines whether only one type of variable is included in a spoken command and if so, merges the variable with historical information to derive a meaning for the command.

6. The system of claim 1 including a speech synthesizer and a memory that stores an indication when an attribute recognized by the speech recognizer is spoken by the speech synthesizer.

7. The system of claim 1 further including a processor coupled to a speaker and microphone, the output from said speaker being subtracted from the output of said microphone to reduce interference between the audio portion of a television program and a spoken request.

8. The system of claim 1 including a television coupled to a set-top box and a remote control that controls said set-top box.

9. The system of claim 1 including a storage that stores files identifying information about portions in an audio/video program.

10. The system of claim 1 including a audio/visual playback device communicating said interface.

11. The system of claim 1 wherein said system includes a speech synthesizer and further includes a unit that implements conversational speech coupled to said speech recognizer.

12. The system of claim 1 wherein said system is a digital video disk player.

13. A method comprising:
recognizing a spoken request to locate a position in an audio/visual program displaced from the current position by a spoken amount of time; and
converting the recognized request to a format compatible with an audio/visual playback device.

14. The method of claim 13 wherein recognizing a request includes locating a chapter in a digital audio/visual playback device.

15. The method of claim 13 including transmitting said request in a converted format over a wireless interface to said audio/visual playback device.

16. The method of claim 13 wherein recognizing a request includes recognizing a request to locate a particular chapter.

17. The method of claim 13 wherein recognizing a spoken request includes using a conversational speech recognition system.

18. The method of claim 13 including identifying a position of said audio/visual program by a data file having a field which identifies information about said position.

19. The method of claim 18 including searching said data files to locate information corresponding to said spoken request.

20. An article comprising a medium for storing instructions that, if executed, enable a processor-based system to:
recognize a spoken request to playback audio/visual content at a position in an audio/visual program displaced by a spoken amount of time from the current position being played back in the audio/visual program; and
convert the recognized request to a format compatible with an audio/visual playback device.

21. The article of claim 20 further storing instructions that cause a processor-based system to locate a chapter in a digital audio/visual playback device.

22. The article of claim 20 further storing instructions that cause a processor-based system to transmit said request in a converted format over a wireless interface to said audio/visual playback device.

23. The article of claim 20 further storing instructions that cause a processor-based system to recognize a request to locate a particular chapter.

24. The article of claim 20 further storing instructions that cause a processor-based system to implement a conversational speech recognition system.

25. The article of claim 20 further storing instructions that cause a processor-based system to identify a position of said audio/visual program by data file field which identifies information about said position.

26. The article of claim 25 further storing instructions that cause a processor-based system to search a plurality of data files to locate information corresponding to said spoken request.

* * * * *